Aug. 15, 1933.                J. P. TEMPLEMAN                1,922,988
                          HAND OPERATED CAR BRAKE
                           Filed April 20, 1928            4 Sheets-Sheet 2
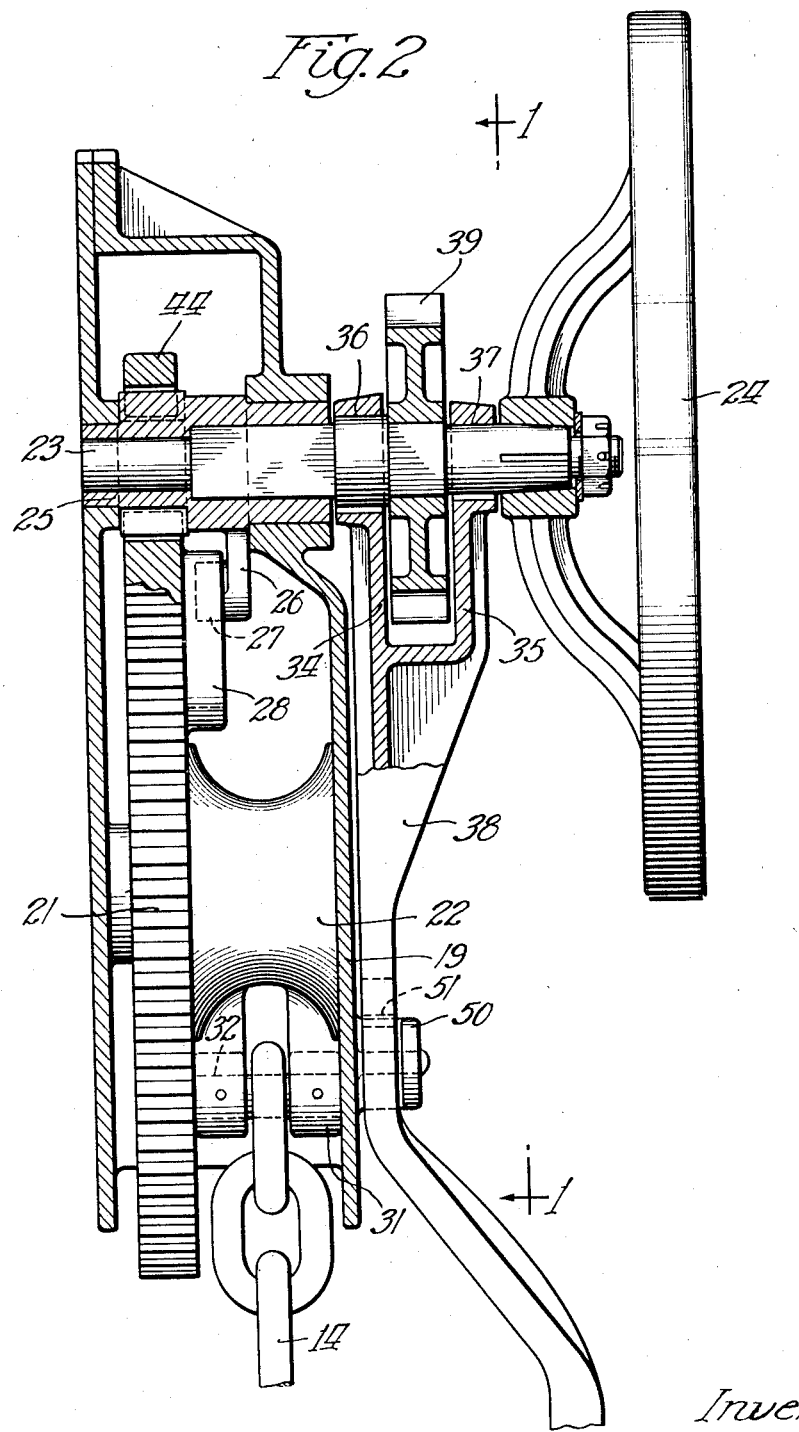
Inventor
John P. Templeman

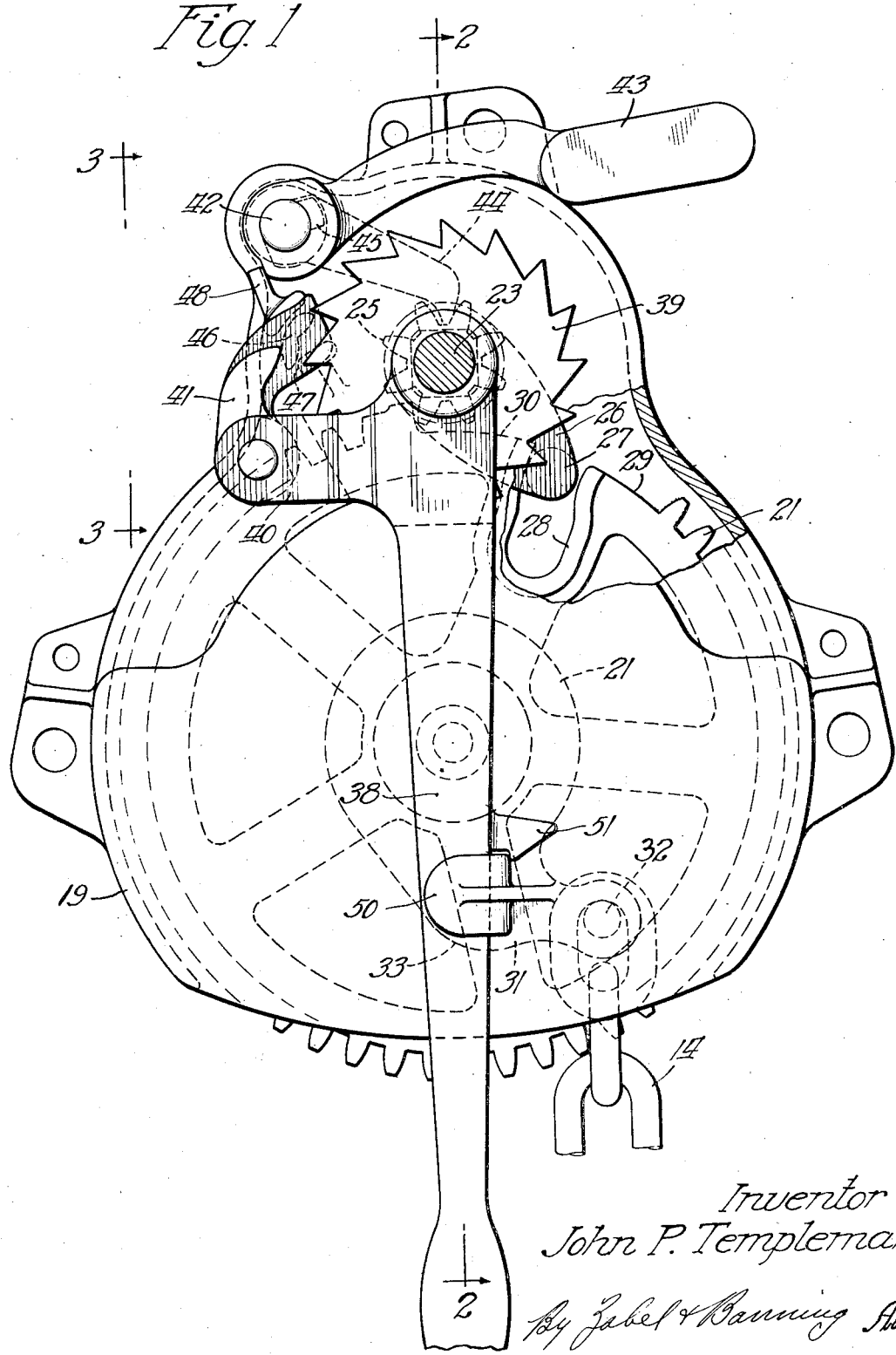

Aug. 15, 1933.  J. P. TEMPLEMAN  1,922,988
HAND OPERATED CAR BRAKE
Filed April 20, 1928    4 Sheets-Sheet 3
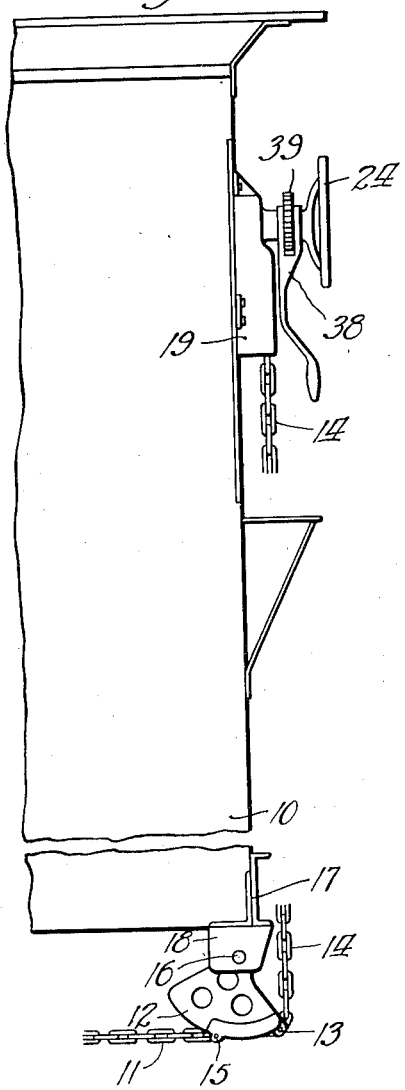
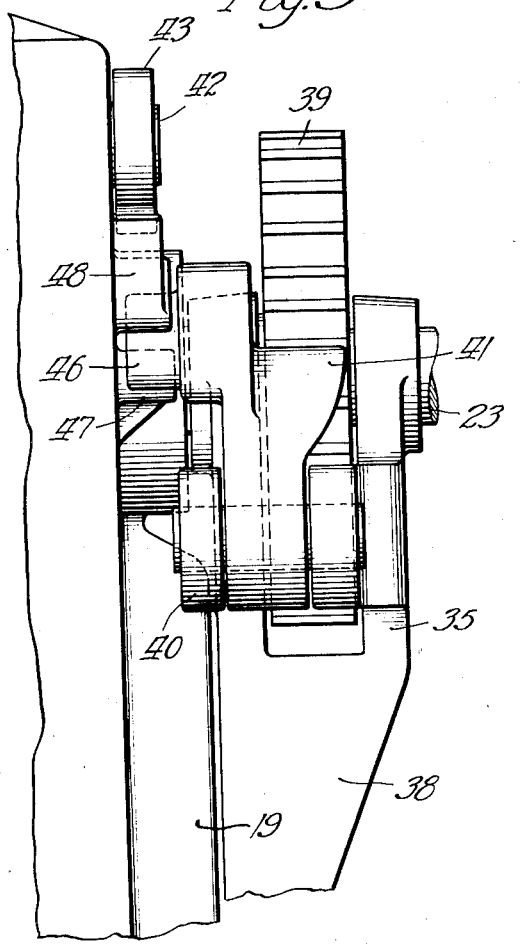
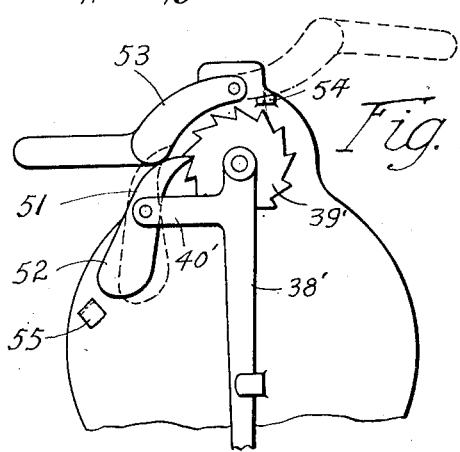
Inventor
John P. Templeman
By Zabel & Banning  Attys

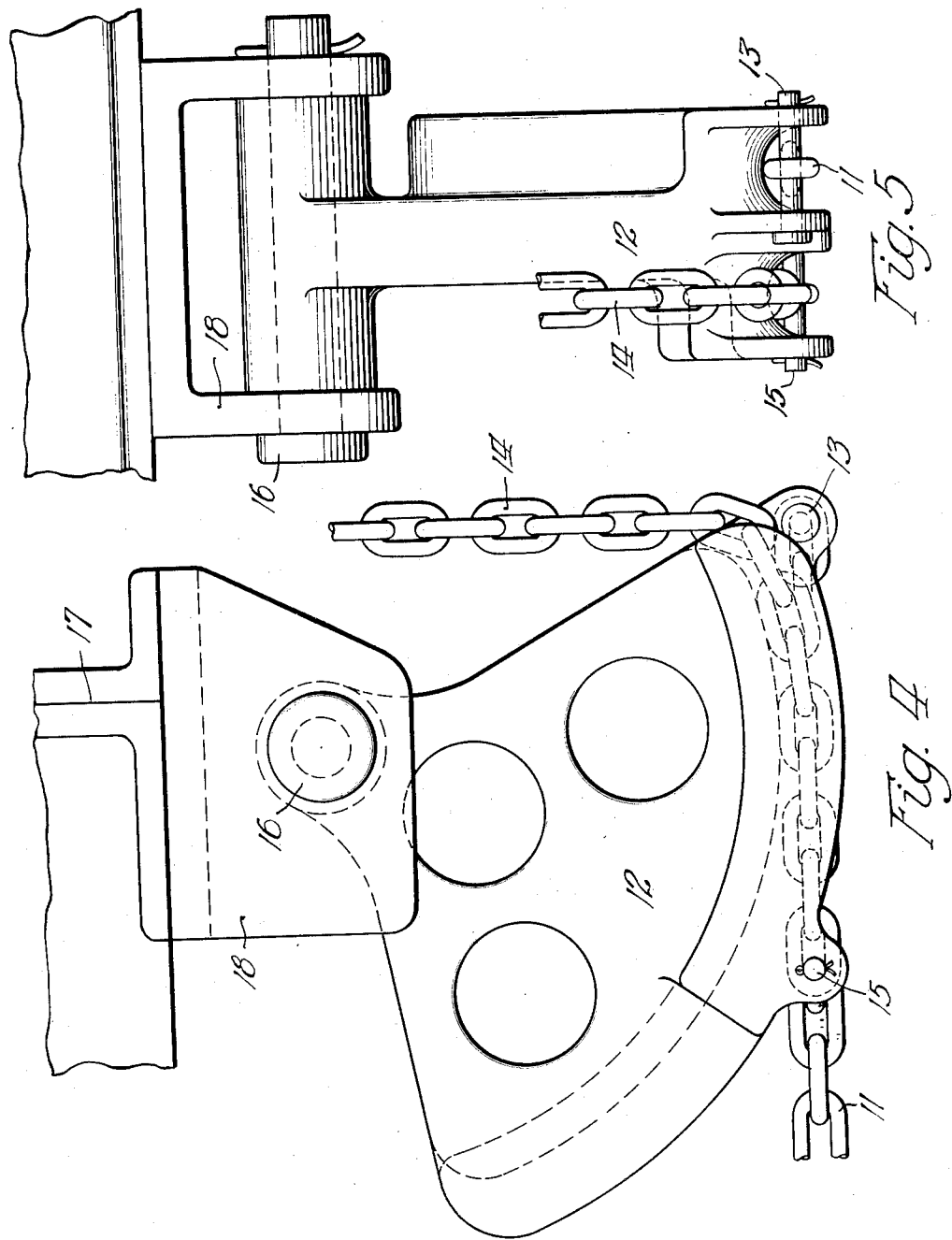

Patented Aug. 15, 1933

1,922,988

UNITED STATES PATENT OFFICE 1,922,988

HAND OPERATED CAR BRAKE

John P. Templeman, Chicago, Ill.

Application April 20, 1928. Serial No. 271,462

4 Claims. (Cl. 74—112)

My invention relates to railway car brakes of the hand-operated type, and more particularly to the type of brake wherein the brake-operating mechanism is mounted on the end of the car and has depending therefrom the brake chain, which extends to the lower edge of the car and then around the sheave pivoted at this point and horizontally beneath the car body.

It is the principal purpose of this invention to provide, in a brake mechanism of this character having the ordinary hand wheel for taking up the slack in the brake chain and applying a certain amount of pressure, means consisting of a power lever for thereafter rotating the brake shaft step by step with the greater leverage thereon so as to apply a much greater pressure than could be accomplished with the ordinary hand wheel.

It is also a purpose of this invention to provide the power lever or handle hereinbefore referred to with a pawl and ratchet connection to the brake shaft and means for causing the pawl on the lever to always operate in the same manner to engage the ratchet teeth on the shaft.

Another purpose of this invention is to provide, in connection with the power lever above mentioned, means for locking the brake shaft against return rotation when it has been rotated one step by the power lever, and then to provide the locking means in such manner that the same may be released so that the shaft will follow the power handle back, thus easing off the brakes under the control of the power handle.

Another purpose of this invention is to provide, in connection with the above mentioned power lever and hand wheel, means for quickly taking up the slack in the brake chain by the initial rotation of the hand wheel.

A further object of the invention is to provide, in combination with the brake-shaft operating mechanism, a novel means for connecting the brake chain to the sheave at the lower edge of the car.

Other objects and advantages of the invention will appear as the description proceeds, in connection with the accompanying drawings. However, it is to be distinctly understood that I do not intend to limit myself to the exact details shown and described, but that I intend to avail myself of all such modifications as would occur to one skilled in this art and as fall within the scope of the claims.

In the drawings,—

Fig. 1 is a face view, partly in section, showing the brake-operating mechanism;

Fig. 2 is a section on the line 2—2 of Fig. 1;

Fig. 3 is a fragmentary side view taken from the line 3—3 of Fig. 1;

Fig. 4 is a side view of the improved sheave utilized with my invention;

Fig. 5 is an end view of the structure shown in Fig. 4;

Fig. 6 is a side view of a portion of a railway car showing my improved brake mechanism applied thereto; and Fig. 7 is a side view of a modified form.

Referring now in detail to the drawings, the numeral 10 represents generally the body of a railway car to which my invention is to be applied.

As shown in Fig. 6, the horizontally extending brake chain 11 is connected to the sheave 12 at the point 13, while the vertically extending brake chain 14 is connected to the sheave 12 at the point 15, each of these chains being guided in a separate groove in the sheave. The sheave, as shown, is pivoted at 16 to the lower end sill of the car, as shown at 17, by means of a bracket 18. The brake chain 14 extends upwardly and is connected to the gear and drum within the brake housing 19, which, as shown, is also on the end of the car adjacent the top thereof. The brake gear mechanism within the housing 19 will now be described in detail.

This housing, as shown, is to be bolted or otherwise secured to the end of the car and has rotatably mounted therein the large gear 21, with which also is rigidly connected the brake drum 22. Brake shaft 23 is journaled in the housing and extends outwardly therefrom away from the car, where it is provided at its free end with the hand wheel 24. The shaft 23 has rigidly mounted thereon a pinion 25, which is adapted to engage the gear 21 and rotate the same upon rotation of the shaft 23.

This pinion and gear 21 also have a cam and pin connection which serves, upon the initial rotation of the shaft 23, to cause a rapid movement of the gear 21 for a short time, after which the gear teeth on the gear wheel and pinion engage and the gear wheel is rotated at a slower rate. This cam and pin connection consists of the arm 26 projecting from the hub of the pinion 25 and having the pin 27 at the end thereof, and the cam slot 28 extending substantially radially inwardly on the outer edge of the gear wheel 21. A number of the teeth are removed from the gear wheel adjacent the cam slot 28, as shown clearly at 29 and 30 in Fig. 1. This, it will be seen, permits the pinion to move the gear much more rapidly by means of the pin 27 so long as it engages in the slot 28 than it would move if it were engaging the teeth on the gear.

Another quick take-up device is provided by the connection of the brake chain 14 with the gear and brake drum. This is accomplished by means of the arm 31 projecting outward from the brake drum, to which the chain is secured by means of the pin 32. This arm 31, as shown in dotted lines in Fig. 1, is provided with the raised portion at 33, over which the chain must ride when the gear is rotated in a counter-clockwise direction to tighten the brake chain. Thus, during substantially the first half turn of the gear 21, the chain is tightened very rapidly by means of the long distance which the end of the arm 31 must travel and the rapid angular movement given to the gear 21 by the cam and pin connection with the pinion.

The structure described thus far serves to efficiently take up the slack in the brake chain and, within the limitations of the strength of the person operating the wheel 24, to apply a certain amount of tension on the chain. However, when the tension on the chain gets up to two thousand to twenty-four hundred pounds it is very difficult to turn the wheel 24. In order to provide means whereby the requisite tension may be put on the chain, without too great an effort upon the part of the operator, I provide additional means whereby the operator may attain a greater leverage on the brake shaft and rotate it step by step by means of a power lever.

This power lever, as shown more clearly in Fig. 2, is suspended from the brake shaft by means of the arms 34 and 35, which are loosely pivoted about the shaft, as at 36 and 37. The power lever 38 is integral with the pivoting arms 34 and 35 and normally is suspended below the brake shaft in a substantially vertical position. A ratchet wheel 39 is secured to the shaft 23 between the arms 34 and 35, and the power lever 38 has a lateral offset 40, to which is pivoted a dog 41 adapted to engage the ratchet wheel 39.

The housing also carries a shaft 42, to which is secured a handle 43 on the outside of the housing and a pawl 44 on the inside of the casing for a purpose which will presently appear.

Now when the power lever 38 is rotated out of its normal resting position the pawl pivoted thereto will engage the teeth of the ratchet wheel 39, and thus rotate the brake shaft a certain amount in a direction to tighten up the brake chain. The pawl 44 may then be locked with the teeth of the pinion 25 in the position shown in Fig. 1, and the power lever can be returned to its original position. The handle 43, when it is desired to release the brake, may then be thrown to the left from the position shown in Fig. 1, when it will engage a lug 45 on the shaft 42 and cause the shaft 42 to turn in a counter-clockwise direction to move the pawl 44 out of engagement with the pinion 25.

It will be seen that by maintaining the pawl 44 in released position and holding to the power lever 38, the brake operator may permit the brakes to ease off or release slowly by allowing the power lever to gradually return to its normal resting position.

The pawl 41, as shown more clearly in Fig. 3, has a laterally extending portion 46 which serves, first, as giving added weight to the pawl so that it will tend by the force of gravity to fall into engagement with the ratchet wheel 39, and, secondly, this portion 46 co-operates with guide lugs 47 and 48 formed on the housing 19 to guide the pawl toward the ratchet wheel 39 when the lever is moved out of its normal resting position and insure that the pawl will not be stuck by rusting at its pivot point, while at the same time, on the return of the lever to its normal resting position, the guides 47 and 48 effectively guide the pawl 41 away from the wheel 39, and thus permit free rotation of the wheel 39 without danger of its striking the end of the pawl.

The power lever 38 is adapted when in resting position to engage a stop 50 which projects from the housing 19 and has a latch 51 thereon co-operating with the stop to prevent the lever from swinging to and fro due to the swaying of the car. The pivotal mounting at 36 and 37 of the lever is, as shown in Fig. 2, sufficiently loose to permit the catch 51 to be disengaged by a slight lifting of the lever 38.

In Figs. 4 and 5 the sheave hereinbefore referred to is shown more in detail than it is found in Fig. 6. This sheave is substantially in the form of a quadrant having one groove extending along the curved face thereof substantially throughout its length, and to this groove the chain 11 is applied, the chain being secured at the outer end of the groove by means of a pin, as shown at 13. Chain 14, however, is guided in another groove which lies along side the first mentioned groove, but extends substantially only half way along the face of the sheave, the chain 14 being fastened at the termination of this groove, as at 15. Now when the chain 14 is drawn up by the rotation of the brake shaft and the associated mechanism, the sheave is caused to swing about its axis at 16, and at the same time it tightens the chain 11, which tends to fall down into the groove as the sheave is rotated about its axis. This permits a full swing of the sheave throughout substantially the amount that the chain 11 must be tightened without the chain being drawn around a sharp corner thereof; that is, a complete ninety-degree rotation of the sheave would not cause any change in the relative distance between the chain 11 and the car floor, which is very essential, since if the chain is to be drawn up or forced downwardly it is apt to be engaged with obstructions and damaged in this manner.

In Fig. 7 a slightly modified form of pawl and ratchet construction is illustrated. In this form the ratchet 39' and lever 38' are connected to the shaft in the same manner as in the preferred form. The lever has a pawl 51 pivoted on the arm 40' which pawl has a weighted arm 52 acting to normally hold the pawl clear of the ratchet teeth. The locking arm 43 and pawl 44 are not used in this form. A lever 53 is pivoted on the housing above the brake shaft so that in the full line position shown in Fig. 7 it engages the back of the pawl and forces it into engagement with the ratchet teeth so that upon moving the lever 38' the ratchet will be turned. When the lever 53 is thrown into its dotted line position the pawl will remain out of contact with the ratchet due to the weight of arm 52. A stop 54 is provided on the housing for lever 53 when it is in the dotted line position.

In order to hold the lever 38' in raised position a projection 55 is provided on the housing. The lever 38' when raised may be pushed toward the housing due to its loose mounting on the brake shaft and hooked over the projection 55 in an obvious manner.

It is thought that from the foregoing description the construction and advantages of this invention will be clear to those skilled in this art.

Having thus described my invention, what I claim as new and desire to secure by Letters Patent of the United States is:

1. In railway car brake mechanism having a gear and drum adapted for connection with a brake chain and a pinion for rotating said gear and drum, a housing for said pinion, gear and drum, a brake shaft for said pinion projecting from said housing, a hand wheel on said shaft, a ratchet wheel rigid with said shaft outside said housing, a lever pivoted about said shaft, a pawl pivoted on said lever, and guide means on said housing adapted to guide said pawl toward said ratchet wheel upon rocking of said lever out of its normal resting position.

2. In railway car brake mechanism having a gear and drum adapted for connection with a brake chain and a pinion for rotating said gear and drum, a housing for said pinion, gear and drum, a brake shaft for said pinion projecting from said housing, a hand wheel on said shaft, a ratchet wheel rigid with said shaft outside said housing, a lever pivoted about said shaft, a pawl pivoted on said lever, and guide means on said housing adapted to guide said pawl toward said ratchet wheel upon rocking of said lever out of its normal resting position, said pawl being adapted on further rocking of said lever to drop by force of gravity into contact with said ratchet wheel.

3. In a railway car brake operating mechanism having a brake drum, and a gear and pinion meshing with one another and arranged to rotate about substantially horizontal axes, a brake shaft for said pinion, a lever pivotally suspended therefrom, a ratchet wheel on said brake shaft, a pawl pivotally carried by said lever, and guide means for said pawl forcing it toward said ratchet wheel when said lever is moved out of its normal resting position, said guide means preventing engagement of said pawl and ratchet when said lever is in normal resting position.

4. In a railway car brake operating mechanism having a brake drum and a gear and pinion meshing with one another and for rotating said drum arranged to rotate about substantially horizontal axes, a shaft for said pinion, a hand wheel for rotating said shaft, a lever pivotally suspended from said shaft, a ratchet wheel on said shaft, a member on said lever adapted upon movement of said lever upwardly from normal position to engage said ratchet wheel whereby said shaft may be turned in one direction by said lever, guide means for positively moving said member away from said ratchet wheel when said lever is turned in the opposite direction by rotation of said shaft, said hand wheel being operable to hold said ratchet wheel and permit return of said lever to normal position under force of gravity from any position within the range of movement of said lever.

JOHN P. TEMPLEMAN.